US009053018B2

(12) United States Patent
Fontenot et al.

(10) Patent No.: US 9,053,018 B2
(45) Date of Patent: Jun. 9, 2015

(54) COMPRESSED MEMORY PAGE SELECTION BASED ON A POPULATION COUNT OF A DATASET

(75) Inventors: Nathan D. Fontenot, Georgetown, TX (US); Jeffrey David George, Austin, TX (US); Ryan P. Grimm, Austin, TX (US); Joel H. Schopp, Austin, TX (US); Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/538,204

(22) Filed: Jun. 29, 2012

(65) Prior Publication Data
US 2014/0006745 A1    Jan. 2, 2014

(51) Int. Cl.
*G06F 12/04* (2006.01)
*G06F 12/02* (2006.01)

(52) U.S. Cl.
CPC ........ *G06F 12/04* (2013.01); *G06F 2212/1044* (2013.01); *G06F 12/02* (2013.01); *G06F 2212/401* (2013.01)

(58) Field of Classification Search
CPC ... G06F 2212/401; G06F 12/04; G06F 12/02; G06F 2212/1044; H03M 7/30
See application file for complete search history.

(56) References Cited

U.S. PATENT DOCUMENTS

| | | | |
|---|---|---|---|
| 5,729,228 A | 3/1998 | Franaszek et al. | |
| 6,324,621 B2 | 11/2001 | Singh et al. | |
| 6,360,300 B1 | 3/2002 | Corcoran et al. | |
| 6,681,305 B1 * | 1/2004 | Franke et al. | 711/170 |
| 6,775,751 B2 * | 8/2004 | Tremaine | 711/154 |
| 6,857,045 B2 | 2/2005 | Galbraith et al. | |
| 7,243,191 B2 | 7/2007 | Ying et al. | |
| 7,412,564 B2 | 8/2008 | Wood et al. | |
| 7,895,242 B2 * | 2/2011 | Ergan et al. | 707/802 |
| 7,958,289 B2 * | 6/2011 | Benveniste et al. | 710/68 |
| 8,161,206 B2 | 4/2012 | Benveniste et al. | |
| 2004/0250009 A1 * | 12/2004 | Chen et al. | 711/103 |
| 2007/0088920 A1 | 4/2007 | Garcia et al. | |
| 2010/0122058 A1 | 5/2010 | Rana et al. | |
| 2010/0269118 A1 | 10/2010 | Arimilli et al. | |

OTHER PUBLICATIONS

Jackson, Robert O., "Heterogeneous Computer Architecture Progress Report", Aug. 22, 1996, pp. 47-49, Section 4.8.3, Speculative and Lazy Evaluation.
http://semipublic.comp-arch.net/wiki/Population_count_ (POPCNT), retrieved Mar. 20, 2012, 4 pages.
http://en.wikipedia.org/wiki/Hamming_weight, Retrieved Mar. 20, 2012, 6 pages, "History and Usage" and "Efficient Implementation".

* cited by examiner

*Primary Examiner* — Sanjiv Shah
*Assistant Examiner* — Glenn Gossage
(74) *Attorney, Agent, or Firm* — Fleit Gibbons Gutman Bongini & Bianco PL; Thomas Grzesik

(57) ABSTRACT

A method, system, and computer program product for selecting memory pages for compression based on a population count associated with their datasets are disclosed. For example, a dataset stored in a memory page of an uncompressed memory is analyzed. Based on the analyzing, a population count associated with the dataset is identified. The population count is compared to at least one threshold. Based on the comparing, the memory page is selected or rejected for compression.

20 Claims, 6 Drawing Sheets

| Data | size | Compr 1 (Best) | Savings % | Compr 1 (Fast) | Savings % | Compr 2 (Best) | Savings % | Compr 2 (Fast) | Savings % | 1s count | 1s % |
|---|---|---|---|---|---|---|---|---|---|---|---|
| 4k rand | 4096 | 4119 | -0.56% | | | | | | | 2049 | 50.02% |
| 4k jpg | 4096 | 3074 | 24.95% | | | | | | | 1307 | 31.91% |
| 4k xml | 4096 | 715 | 82.54% | | | | | | | 1926 | 47.02% |
| 4k html | 4096 | 1700 | 58.50% | | | | | | | 1867 | 45.58% |
| 4k ascii text | 4096 | 1776 | 56.64% | | | | | | | 1550 | 37.84% |
| 4k zero | 4096 | 38 | 99.07% | | | | | | | 0 | 0.00% |
| 64k rand | 65536 | 65564 | -0.04% | 65564 | -0.04% | 66180 | -0.98% | 66180 | -0.98% | 32835 | 50.10% |
| 64k jpg | 65536 | 64604 | 1.42% | 64662 | 1.33% | 65052 | 0.74% | 65052 | 0.74% | 32197 | 49.13% |
| 64k xml | 65536 | 7687 | 88.27% | 10036 | 84.69% | 7121 | 89.13% | 10036 | 84.69% | 29700 | 45.32% |
| 64k html | 65536 | 15666 | 76.10% | 17849 | 72.76% | 15665 | 76.10% | 15665 | 76.10% | 29685 | 45.30% |
| 64k ascii text | 65536 | 21279 | 67.53% | 24644 | 62.40% | 19917 | 69.61% | 19917 | 69.61% | 28705 | 43.80% |
| 64k zero | 65536 | 96 | 99.85% | 319 | 99.51% | 43 | 99.93% | 43 | 99.93% | 0 | 0.00% |

COMPRESSED MEMORY PAGE SELECTION BASED ON A POPULATION COUNT OF A DATASET

BACKGROUND

The present invention generally relates to computer memory architecture, and more particularly relates to managing compressed memory.

Today many computing systems are implementing compressed memory as a way to expand the effective size of physical RAM (random access memory) and improve system performance. One of the major problems with compressed memory is that most current compression architectures are unable to efficiently compress random data or data that has been previously compressed. Also, most compressed memory systems perform compression operations on data within a memory page and if the data does not compress below a threshold these systems attempt to compress another page. These blind compression attempts consume a large amount of resources.

BRIEF SUMMARY

In one embodiment, a method for selecting memory pages for compression is disclosed. The method comprises analyzing a dataset stored in a memory page of an uncompressed memory. Identifying, based on the analyzing, a population count associated with the dataset. The population count is compared to at least one threshold. The memory page is one of selected and rejected for compression based on the comparing.

In another embodiment, an information processing system for selecting memory pages for compression is disclosed. The information processing system comprises an uncompressed memory and a compressed memory. A processor is communicatively coupled to the uncompressed memory and the compressed memory. A compression manager is communicatively coupled to the processor and is configured to perform a method. The method comprises analyzing a dataset stored in a memory page of an uncompressed memory, and identifying, based on the analyzing, a population count associated with the dataset. The population count is compared to at least one threshold. The memory page is one of selected and rejected for compression based on the comparing.

In yet another embodiment, a computer program product for selecting memory pages for compression is disclosed. The computer program product comprises a storage medium readable by a processing circuit and storing instructions for execution by the processing circuit for performing a method. The method comprises analyzing a dataset stored in a memory page of an uncompressed memory, and identifying, based on the analyzing, a population count associated with the dataset. The population count is compared to at least one threshold. The memory page is one of selected and rejected for compression based on the comparing.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 5 comprises experimental data showing the relationship between the population count of data within a memory page and the compressibility of the memory page.

DETAILED DESCRIPTION

Operating Environment

Figure 1:
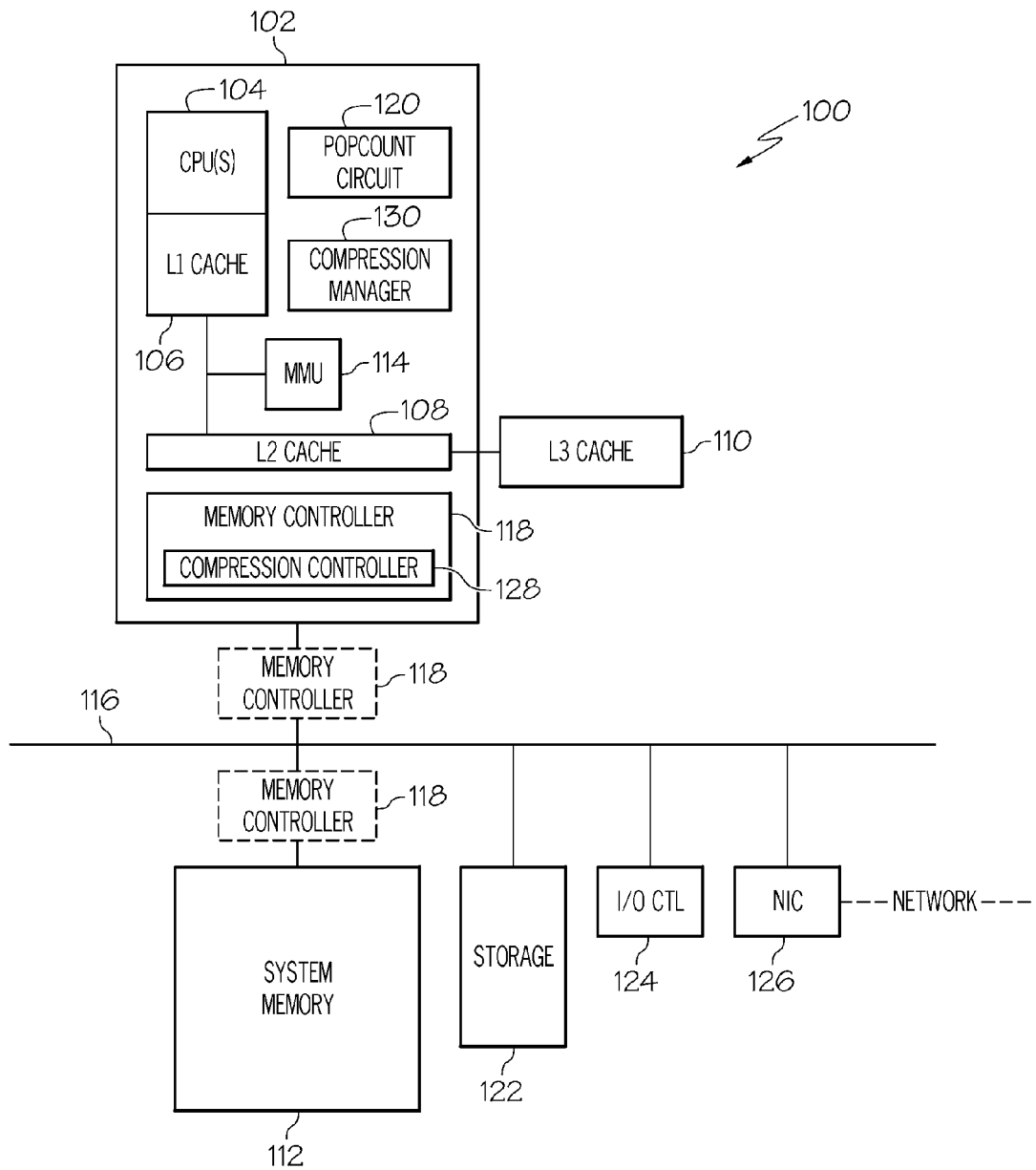
FIG. 1 is a block diagram illustrating one example of an operating environment according to one embodiment of the present invention.

FIG. 1 illustrates a general overview of one operating environment according to one embodiment of the present invention. In particular, FIG. 1 shows the overall structure of an information processing system 100. The information processing system 100 can be any type of information processing system such as, but not limited to, a personal computer system, a server computer system, a thin client, a thick client, a hand-held or laptop device, an embedded system such as a wireless communication device or a netbook, a tablet computing device, a multiprocessor system, a microprocessor-based system, a set top box, a programmable consumer electronic, a network personal computer (PC), a minicomputer system, a mainframe computer system, a distributed cloud computing system, or the like. In addition, various embodiments are also applicable to virtualized environments as well.

The system 100 of FIG. 1 comprises at least one processor chip 102 that includes one or more central processing units (CPU) 104 connected to a memory system. The memory system comprises on-chip L1 cache 106 (e.g., a combination data cache and instruction cache or bifurcated caches), on-chip shared lower level (L2) cache 108, on/off-chip L3 cache 110, and a system (main) memory 112. The main memory 112, in one embodiment, includes random access memory (RAM). It should be noted that configurations of cache memory other than that illustrated in FIG. 1 are applicable as well. Access to the various caches is controlled by one or more memory management units (MMU) 114. The MMU 114 comprises various components for handling memory accesses requested by the processor chip 102. For example, the MMU 114 includes a translation look-aside buffer ("TLB"), which includes parts of a page table (included either within or outside of the MMU 114) for translating virtual addresses into real addresses. The MMU 114 also includes components for memory protection and cache control.

In one embodiment, the memory system is a compressed memory system, in which at least a portion of one or more of the main memory 112, cache memories 106, 108, 110, and/or storage 122 is compressed. In this embodiment, a compression controller/engine 128 controls the compression and decompression of data. For example, cache "misses" and "stores" result in reads and writes to the compressed main memory 112. That is, typically the CPU 104 obtains the data from the cache 106, 108, 110 (e.g., assuming a cache "hit"), whereas on a cache "miss" the CPU 104 obtains the data from the main memory 112 through the compression controller 128. Such data is retrieved to the CPU 104 and then the data stored to one or more of the cache memories 106, 108, 110 (e.g., typically a so-called "store-through" cache, which is one of the most common caching techniques). The compressed memory system is discussed in greater detail below.

A compression manager 130 manages the selection/identification of memory pages that are to be compressed by the compression controller 128. If the compression manager 130 "selects" a memory page for compression the page is allowed to be sent to the compression controller 128. The compression manager 130 can reside on the processor chip 102, within the compression controller 128, within the operating system (not shown), etc. The compression manager 130 identifies which memory pages should be compressed based on their associated population counts or hamming weights. Therefore, the processor chip 102, in one embodiment, also comprises a population (popcount) circuit 120, which evaluates popcount values, in one circuit-based popcount embodiment. However, it is appreciated that the illustrated popcount circuit 120 is not necessarily provided on-chip with the CPU 104. Further, the system 100 is not required to have a separate circuit for completing popcount evaluations, and can complete the popcount operation via executable instruction code. The compression manager 130 and popcount circuit 120 are discussed in greater detail below.

The system memory 112 is communicatively coupled to the processor chip 102 via a system interconnect 116 (e.g., a switch or bus). Data storage and other operations on/with the system memory 112 are controlled/managed in part by a memory controller 118, which can be located at one of multiple locations within the system 100. As shown, in one embodiment, the memory controller 118 is located on chip. In other embodiments, the memory controller 118 (illustrated with dashed lines) can be located off the processor chip at one or more locations. In one embodiment, the compression controller 128 is implemented within the memory controller 118. However, in other embodiments the compression controller 128 resides outside of the memory controller 118.

Also connected to the system interconnect 116 is storage 122, which can also comprise compressed and/or uncompressed areas. The storage 122 may stage instructions and data to memory that are utilized during processor execution. One specific type of data storage device 122 is a computer readable medium such as an optical disc drive, which may be used to store data to and read data from an optical disk (Compact Disc (CD), Digital Video/Versatile Disc (DVD), etc.). Another type of data storage device is a hard disk, solid state disk, etc. An Input-Output (I/O) controller 124 is also illustrated and provides connectivity and control for input devices and output devices (not specifically shown). The system 100, in one embodiment, also comprises a network interface controller (NIC) 126, by which the system 100 may connect to one or more other devices via an external network. The system 100 may also comprise many other component or peripheral devices and software modules, which are not shown or described herein.

Figure 2:
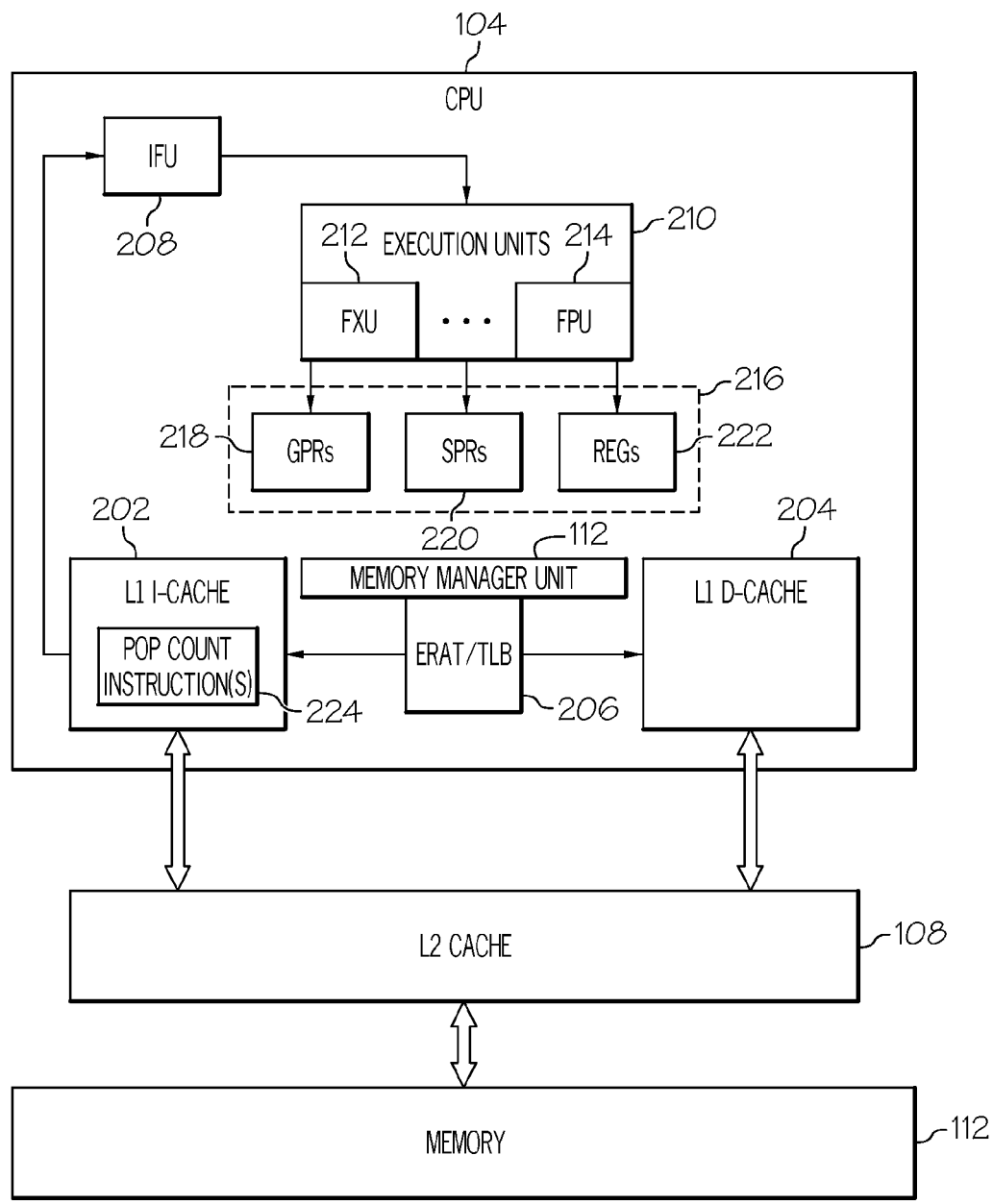
FIG. 2 is a block diagram illustrating a more detailed view of a central processing unit within the operating environment of FIG. 1 according to one embodiment of the present invention.

FIG. 2 shows a more detailed example of the CPU 104 and memory system. The CPU 104 comprises L1 instruction cache (I-cache) 202 and L1 data cache (D-cache) 204 and associated effective to real address translation/translation look-aside buffer (ERAT/TLB) 206 and the MMU 112. The CPU 104 also comprises an instruction fetch unit (or instruction sequencer) 208, which stages instructions to a set of execution units 210, of which a fixed point unit (FXU) 212 and a floating point unit (FPU) 214 are presented. Data and other operands generated during execution by the execution units are held within a series of registers 216, including general purpose registers (GPRs) 218, special purpose registers (SPRs) 220, and other registers 222 are utilized by the FXU 212 to complete certain types of operations execution, including population counting.

In one embodiment, the L1 I-cache 202 comprises a popcount instruction 224, whose execution by one or more of the execution units 210 (e.g., FXU 212) triggers the background counting of the number of 1 bits within a sequence of fixed sized data to which the popcount instruction corresponds. As will be discussed in greater detail below, the popcount instruction 224 (and/or circuit 120) is utilized to determine the compressibility of memory pages. In one embodiment, one or more of the execution units, together with the registers and other processor components, which may not be shown, collectively perform the functions related to retrieval, manipulation, and storage of data at the processor level. These data functions/operations are initiated based on received instructions of an executing application/code.

With the configuration of the system 100, multiple applications may execute in an overlapping manner on the CPU 104, and in one embodiment, each application provides one or more threads of executable instructions that are executed by the processing units. The instructions such as popcount instructions are instructions that are supported within an instruction set architecture supported by CPU 104. It should be noted that the hardware components and basic configuration depicted in FIGS. 1 and 2 may vary. The illustrative components within the system 100 and CPU 104 are not intended to be exhaustive. For example, other devices/components may be used in addition to or in place of the hardware depicted. The depicted example is not meant to imply architectural or other limitations with respect to the presently described embodiments.

Compressed Memory System

As discussed above, the system 100 implements a compressed memory system. In this embodiment compressed portions of the memory system can be referred to as a compressed memory space, in which compressed data is stored. The uncompressed portions of memory can be referred to as an uncompressed memory space, which is another area of the memory where uncompressed data is stored. For example, the compressed memory system can store data either as compressed data or uncompressed data in the main memory 112, and generally as uncompressed data in at least one level of cache or a partition of the main memory 112. It should be noted that one or more portions of the caches 106, 108, 110 (and/or the storage 122) can also be used to store compressed data as well.

Data is decompressed and compressed on demand, responsive to memory read and write access requests. In addition, a memory utilizing data compression can also include a paging space, which is a virtual memory, often a designated space of a hard disk (e.g., storage 122), used as a spillage area for data that cannot be accommodated in the memory. Generally, the compressed memory space and the uncompressed memory space account for the available size of the physical memory in a data processing system. The apparent size of real memory known to the operating system is generally larger than the amount of memory physically present in the system. The amount of the physical memory that is actually used by the computing environment is variable and depends on the effective level of data compression. It should be noted that one or more embodiments of the present invention are applicable to any type of compressed memory and compression mechanisms, and are not limited to the examples discussed herein.

In an embodiment where the main memory 112 is compressed, the compressed main memory 112 is typically divided into a number of logically fixed-size segments (e.g., segments spanning a range of contiguous memory addresses). These logical segments are the units of compression and are referred to as "memory lines". Memory lines are physically stored in a compressed format, and therefore occupy a variable number of physical memory locations. In a paged memory system, the unit of memory management is a "page", usually consisting of 4096 bytes having consecutive real addresses, aligned on a 4096 byte boundary. The unit of compression can be any size and in some systems the unit of compression is a page. To simplify management of the compressed memory system, it is better to select the size of the unit of compression (called a "line") so that the uncompressed size of a page is a multiple of the uncompressed size of a line. A page is then divided into a fixed number of lines, and the bytes of a line are compressed and decompressed together. Hereinbelow, it will be assumed that an uncompressed line is 1024 bytes long. However, this is not a requirement.

Figure 3:
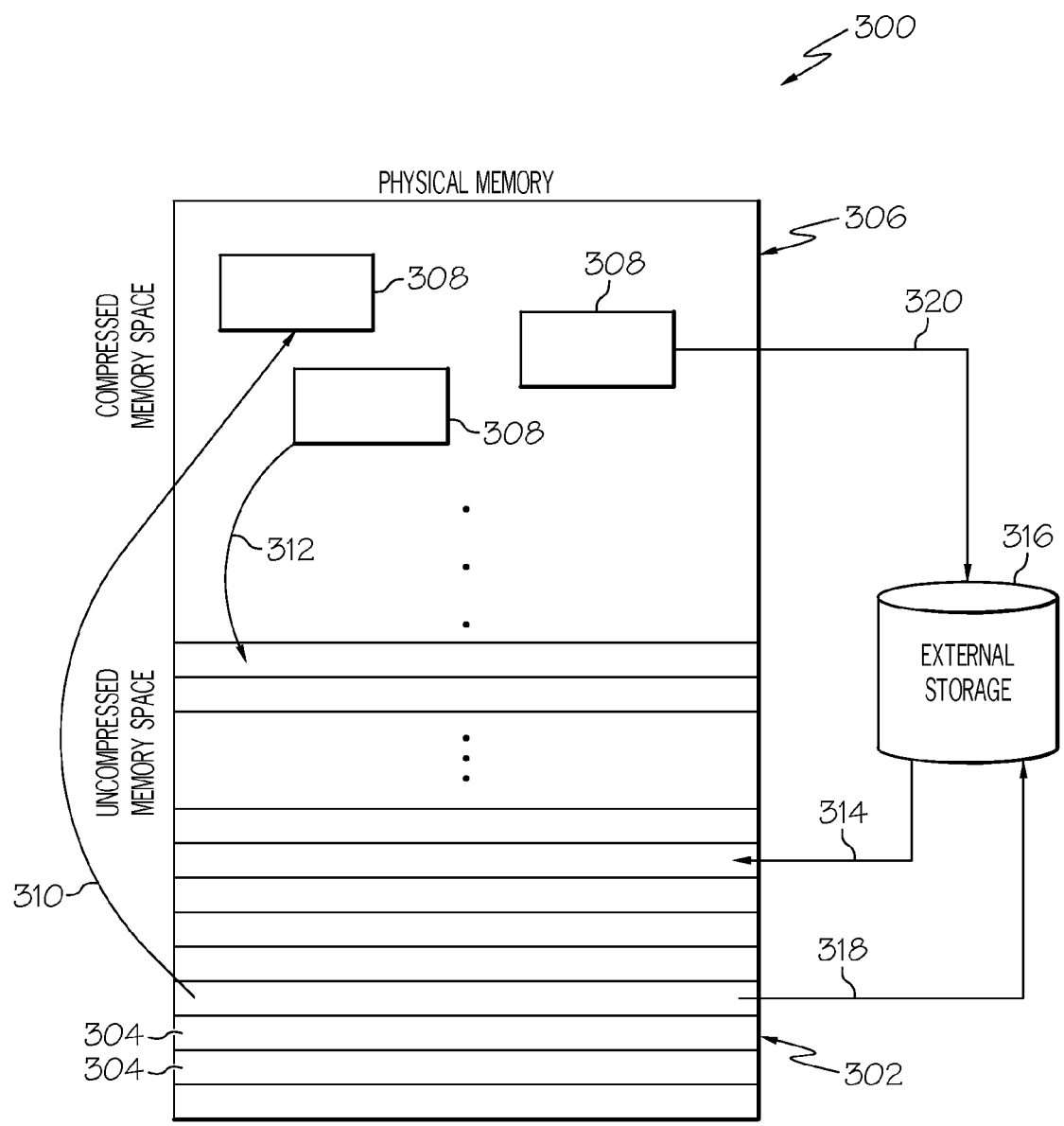
FIG. 3 is a block diagram illustrating one example of a compressed memory system according to one embodiment of the present invention.

FIG. 3 shows one example of a compressed memory system 300. In this example, the physical memory (e.g., main memory 112 and/or cache memory 106, 108, 110) is divided into an uncompressed memory space 302 (comprising uncompressed memory pages 304) and a compressed memory space 306 (comprising compressed pages 308). With memory compression, or more specifically, page compression, the operating system maintains a pool of storage which holds the compressed state of pages. As the contents of physical memory pages 304 are found to be of lower use, they are typically marked as available for reuse, subsequently invalidated, and then the physical page is reused to hold the contents of a different virtual page. However, with a memory compression implementation, the contents of this aged and subsequently invalidated page are instead first compressed 310 in size, while still representing the same information, and copied into the compressed memory space 306. In the event the aged virtual page is subsequently reused, it can be quickly decompressed 312 and restored to the uncompressed memory space 302. This advantageously avoids the rather long latency of having to retrieve the page 314 from an external storage 316 (such as the storage device 122). What this means is that the compressed memory space 306 has the effect of providing a new level of storage hierarchy.

A memory page 308 residing in compressed memory space 306 appears as a "page fault", as would a page residing in external storage 316, but the latency to restore such a page to be accessible is largely the length of time it takes to decompress (312) the page. Pages which are changed, and which must be written (318) to external storage 316, are written from their original, uncompressed state. Once these pages have been written to persistent storage (e.g., Direct Access Storage Device (DASD) controllers, Non-Volatile Random-Access Memory (NVRAM) or disk proper), the pages are considered unchanged and can be compressed and placed into the compressed memory space 306. Changed pages which are essentially aged, have the option of being either stored to external storage 316 before being compressed, or of being held in a changed state in the compressed memory space. Once such changed compressed pages are aged out of the compressed memory space, they then have their contents written (320) to external storage 316.

Figure 4:
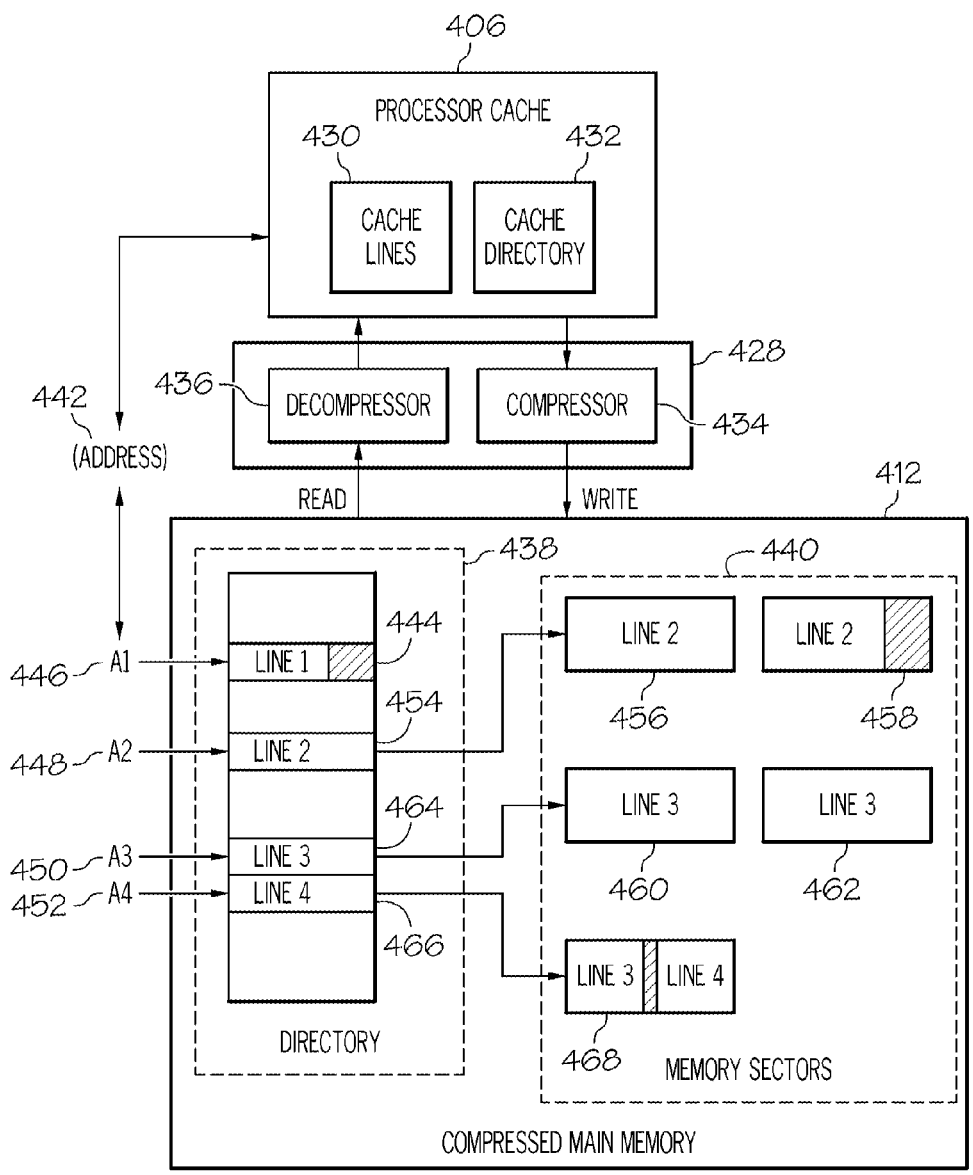
FIG. 4 shows one example of an organization structure for a compressed memory system according to one embodiment of the present invention.

FIG. 4 shows one example of an organization structure that can be used for the compressed memory system 300 shown in FIG. 3. It should be noted that the configuration shown in FIG. 4 is only illustrative and does not limit embodiments of the present invention in any way. The architecture includes a cache 406, containing cache lines 430 and a cache directory 432, a compression controller 428, comprising a compressor 434 and a decompressor 436, and compressed main memory 412. The compressed main memory 412 includes a directory 438 and a number of fixed sized blocks 440, also called "memory sectors". The above format and organization is what is referred to as "main memory compressed data". It should be noted that in other embodiments, at least a portion of the cache 406 is compressed and/or at least a portion of the main memory 412 is uncompressed.

As shown in FIG. 4, for a read from the compressed memory 412 to the cache 406, the decompressor 436 is employed, whereas on a write from the cache 406 to the compressed main memory 412, the line is compressed via the compressor 434. Cache lines can be compressed using various methods such as, but not limited to, standard sequential or a parallel compression algorithms. Examples of sequential compression include Lempel-Ziv coding (and its sequential and parallel variations), Huffman coating and arithmetic coating. One example of parallel compression is given in U.S. Pat. No. 5,729,228, entitled "Parallel Compression and Decompression Using a Cooperative Dictionary", which is hereby incorporated by reference in its entirety.

As known, lines in the cache are held in the main memory 412. Along these lines, if a line must be evicted from the cache (e.g., the cache capacity is exhausted), then the cache line being evicted is written back to the compressed main memory 412 via the compressor 434 if modified. If a line associated with address A is not found in the cache 404, then this address A 442 is used to index into the directory D 438. This is different from a conventional computer system where the address is used to directly reference a location in the memory M 412.

Each directory entry contains information which allows the associated line to be retrieved. The units of compressed data referred to by directory entries in D 438 may correspond to cache lines 430, or the unit of compression may be larger than a cache line in which case multiple cache lines would be compressed together into one unit of compression. The directory entry 444 for line 1 associated with address A1 446 is for a line which has been compressed to a degree in which the compressed line can be stored entirely within the directory entry. Lines associated with addresses A2 448, A3 450, and A4 452 in FIG. 4 do not compress sufficiently to be stored in a directory entry, and therefore they are stored in an integer number of memory sectors. The directory entry 454 for line 2 associated with address A2 448 is for a line which is stored in compressed format using a first full memory sector 456 and second partially filled memory sector 458.

Finally, the directory entries 464, 466 for line 3 and line 4 associated with addresses A3 450 and A4 452 are for lines stored in compressed formats using a number of full memory sectors (2 full memory sectors 460 and 462 for line 3, and no full memory sector for line 4) and in which the remainders of the two compressed lines have been combined in memory sector 468. Memory-sector sharing by different lines within a page (or across pages) is done to reduce fragmentation, and in this situation, lines sharing a memory sector are called roommates.

Compressed Memory Page Selection

As discussed above, most conventional compressed memory systems first perform a compression operation on a memory page and after the operation is performed determine whether or not the amount of compression is acceptable. This process unnecessarily wastes valuable resources. Therefore, the compression manager 130, in one embodiment, first identifies the compressibility of a memory page prior to any compression operations being performed thereon. If the page is determined to be compressible or compressible above (or within) a given threshold, the page is selected for compression. However, if the page is determined to not be compressible or compressible below a given threshold, the page is not selected for compression. In another embodiment, the compressibility can be determined while a compression operation is being performed on the memory page. In this embodiment, the compression operation can be stopped if the page is determined to not be compressible or compressible below a given threshold.

It should be noted that the thresholds can be configured such that a memory page is selected by the compression manager 130 for compression if the memory page is above, below, or within the threshold. Similarly, the thresholds can be configured such that a memory page is rejected for compression by the compression manager 130 if the memory page is above, below, or within the threshold. Examples of thresholds are a single population count, a range of population counts, a population count percentage (e.g., a ratio of 1 s to 0 s), etc. However, other threshold are applicable as well.

In one embodiment, the compression manager 130 determines the compressibility of memory pages based on the popcount (hamming weight) of the data stored therein. The term "compressibility" can refer to either a decision as to whether a page should be or should not be compressed, or can refer to an actual measure of how compressible the memory page is. The popcount of a memory page is determined by the popcount circuit/instruction 120, 224 discussed above. The popcount circuit/instruction 120, 224 analyzes the binary representation of the data stored in the memory page and counts the total number of 1s. Any popcount method or mechanism executable by the CPU 104 for determining/calculating a popcount can be utilized by embodiments of the present invention. For example, execution of the popcount instruction 224 may trigger one embodiment in which a branch-free function for popcount is utilized, or another embodiment in which one of branching popcount code sequence or an alternative popcount code sequence is utilized. Alternatively, in another embodiment in which a specialized popcount circuit 120 is provided within the system 100, the popcount instruction 224 may trigger the specialized popcount circuit 224 to calculate the popcount.

The popcount circuit/instruction 120, 224 can be configured (or instructed by the compression manager 130) to calculate the popcount of a memory page at various points in time. For example, the popcount of a memory page, in one embodiment, is calculated by the popcount circuit/instruction 120, 224 when the memory page is designated for compression by the operating system/hypervisor. A memory page can be selected for compression based on a variety of factors. For example, a memory page may be evicted from an uncompressed memory space by the operating system/hypervisor as a result of "memory pressure". Memory pressure occurs in a system implementing compressed memory when the runtime computing environment demands more memory than is physically available, generally because the data compression level has fallen below expectations and memory occupancy is high. In this situation a memory page is evicted from the uncompressed memory space for storage in the compressed memory space. Particular memory pages are selected using various mechanisms such as, but not limited to, a Least Recently Used (LRU) mechanism. It should be noted that embodiments of the present invention are applicable to any mechanisms/algorithms for determining when and which memory pages are to be compressed.

The compression manager 130 compares the calculated is count (popcount) of the dataset within a memory page to one or more thresholds to determine the compressibility of the memory page. A threshold can be based on the type of data stored within a memory page (e.g., random data, a Joint Photographic Experts Group (JPEG) file, an Extensible Markup Language (XML) file, a HyperText Markup Language (HTML) file, American Standard Code for Information Interchange (ASCII) text etc.), the size of the memory page (e.g., a 4 k page, 64 k page, etc.), experimental data, etc. It should be noted that different thresholds can be used for different data types and/or different memory page sizes. The compression manager 130 determines whether or not a memory page is compressible based on the calculated 1s count (or derivation thereof, e.g., a ratio) being above, below, or within a given range of the threshold(s). For example, if a rejection threshold for a 64 k page is a range comprising 31457 to 34078 1s the compression manager 130 determines that a memory page with a 1s count outside of this range is a good candidate for compression. A memory page having a is count within this range is determined to be non-compressible.

The 1 s (or 0 s) count is a good indicator of compressibility because it was found based on experimentation that data with a relatively even number of 1 s and 0 s such as that found in random data, encrypted data, and/or previously compressed data does not compress well, whereas data with a is count further away from a 50% is to 0s ratio compressed well. It should be noted that embodiments of the present invention are not limited to only using a 1 s count to determine compressibility. For example, the number of non-zero symbols that are different from the zero-symbol of the alphabet being used is also applicable. Also, a 0s count can be used as compared to the is count as well.

It should be noted that, in one embodiment, the compression manager 130 determines how much a memory page can be compressed based on the calculated 1 s count. For example, compression operations can be performed on various types of data within memory pages of given sizes. The popcounts for the data in each of these pages can also be calculated. Compressibility information such as the percentage/amount of compression achieved for each memory page and the calculated 1 s count can be recorded as compressibility information. Information such as the type of data in the page, page size, and like can also be recorded. When the compression manager 130 is determining whether or not a memory page should be compressed, the popcount is calculated for that page, as discussed above, and the compression manager 130 compares the popcount to the compressibility information.

For example, consider a memory page, MEM_PG_A, comprising data with a data type DATA_TYP_A and a popcount of 2000. The compression manager 130 analyzes the compressibility information discussed above to identify compressibility information matching at least the data type and popcount of the given memory page. The popcount can be an exact match, a range including the popcount associated with the given page, etc. Once this matching compressibility information is identified the compression manager 130 identifies the compressibility rate (e.g., percentage) recorded identified information and compares this to a given threshold. If the identified rate fails to satisfy the threshold the compression manager 130 rejects (or marks/flags) the memory page as being non-compressible and performs the above process on another memory page. If the identified rate satisfies the threshold the compression manager 130 selects (or marks/flags) the memory page for compression.

It should be noted that the compression manager 130 is not required to wait until a memory page is designated for compression by the operating system/hypervisor to determine if the page is compressible. For example, the popcount of data within a page can be calculated when the data is stored within the memory page, as compared to being calculated after the page is designated for compression. In this embodiment, the popcount data or at least a pointer to the popcount data is stored in the memory page along with the data. The compression manager 130 can then determine the compressibility of the page before or after the page is designated for compression (e.g., evicted from the uncompressed memory for storage within the compressed memory). If the compression manager 130 determines the compressibility of the page prior to the page being selected for compression, the compression manager 130 can mark/flag the page to indicate whether or not the page is to be selected for compression. Therefore, when the operating system/hypervisor is determining which pages to evict from the uncompressed memory to be compressed and stored within the compressed memory, the operating system/hypervisor only needs to look at the flags of each memory page to identify the pages that have been marked as compressible.

In another embodiment, the compression manager 130 determines the compressibility of memory pages currently in the process of being compressed. In this embodiment, the compression manager stops the compression operation before it is completed if the data was not compressing (or being compressed according to a threshold). If for instance a 64 k page were processed only to 4 k before deciding to stop, 93.75% of the processing time would be saved on pages that did not compress well. Various thresholds and threshold points can be used in this embodiment. For example, the compression manager 130 can determine whether the data in the first 4 k of data in a 64 k memory page has been compressed to at least a given threshold (e.g., 35%). If not, the compression manager 130 stops the compression process. If so, the compression process is allowed to continue. This process can be performed for each 4 k section of a 64 k memory page, but is not required to be repeated.

FIG. 5 shows experimental data resulting from one or more of the embodiments discussed above being performed. In particular, the popcount was determined for various 4 k and 64 k memory pages comprising the following data types: random data, a JPEG file, an XML file, an HTML file, ASCII text, and zero data (i.e., popcount is all 0s). Various compression techniques and qualities (e.g., best and fast) were utilized to compress each of the memory pages. From the data shown in FIG. 5 one can see that the 64 k memory pages comprising random data and JPEG data have a 1s count close to 50% and do not compress well. However, the XML, HTML, ASCII text, and zero data all have a is ratios farther away from 50% and do compress well. This holds true for two different common compression algorithms and with different settings of those algorithms, as shown in FIG. 5. The percentage of compression obtained for each dataset is shown under the respective compression columns.

Therefore, by calculating the popcount for data within a memory page embodiments of the present invention are able to at least determine if the memory page is compressible and whether or not the page should be selected for compression. This allows for memory pages that benefit the most from compression to be selected and also prevents resources from being wasted on compressing non-compressible (or minimally compressible) pages.

Operational Flow Diagram

Figure 6:
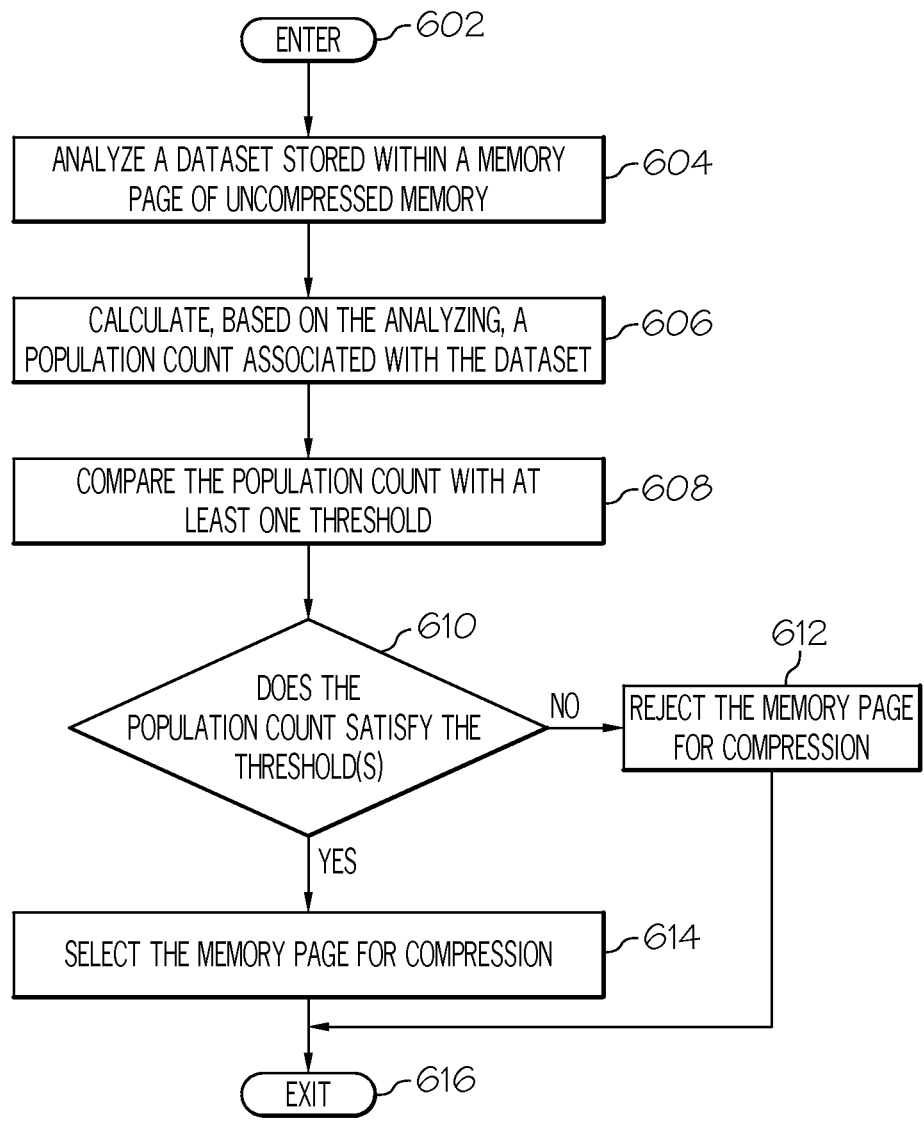
FIG. 6 is an operational flow diagram illustrating one example of determining the compressibility of a memory page based on a population count associated with its data according to one embodiment of the present invention.

FIG. 6 is an operational flow diagram illustrating one example of selecting/rejecting memory pages for compression based on their associated popcounts. The operational flow diagram of FIG. 6 begins at step 602 and flows directly to step 604. The compression manager 130, at step 604, analyzes a dataset stored within a memory page of an uncompressed memory. The compression manager 130, at step 606, identifies a population count associated with the dataset based on the analyzing. The compression manager 130, at step 608, compares the population count to at least one threshold. The compression manager 130, at step 610, determines if the population count has satisfied the threshold(s). If the result of this determination is negative, the compression manager 130, at step 612, rejects the memory page for compression. The control flow then exits at step 616. If the result of this determination is positive, the compression manager 130, at step 614, selects the memory page for compression. The control flow then exits at step 616.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present invention may be written in any combination of one or more programming languages, including an object oriented programming language such as Java JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for selecting memory pages for compression, the method comprising:
    analyzing a dataset stored in a memory page of an uncompressed memory;
    identifying, based on the analyzing, a population count associated with the dataset;
    determining at least one of a data type associated with the dataset and a page size associated with the memory page storing the dataset;
    identifying, from a plurality of compressibility information sets, a compressibility information set matching the data type and the population count associated with the memory page storing the dataset, each compressibility information set comprising historical data identifying a compressibility rate achieved for a dataset of a given data type and a given population count;
    comparing the compressibility rate associated with the identified compressibility information to at least one threshold; and
    based on the comparing, one of selecting and rejecting the memory page storing the dataset for compression.

2. The method of claim 1, further comprising:
    associating a flag with the memory page storing the dataset, wherein the flag informs an operating system that the memory page storing the dataset has been one of selected and rejected for compression.

3. The method of claim 1, wherein identifying the population count comprises:
    analyzing a binary representation of the dataset; and
    counting a total number of 1s in the binary representation of the dataset, wherein the total number of 1s is the population count.

4. The method of claim 1, wherein the at least one threshold is based at least one of:
    a single population count;
    a range of population counts; and
    a population count percentage.

5. The method of claim 1, wherein the one of selecting and rejecting is further based on the memory page storing the dataset being selected to be moved from the uncompressed memory to a compressed memory.

6. The method of claim 1, wherein the one of selecting and rejecting is further based on the memory page storing the dataset being stored in the uncompressed memory.

7. The method of claim 1, wherein the one of selecting and rejecting is further based on the memory page storing the dataset currently having a compression operation being performed therein.

8. The method of claim 1, wherein the population count is identified before the memory page storing the dataset has been designated for compression.

9. The method of claim 1, wherein the at least one threshold is based on previously calculated population counts for data stored in memory pages in the uncompressed memory, and an amount of compression achieved for the memory page storing the dataset after a compression operation was performed thereon.

10. An information processing system for selecting memory pages for compression, the information processing system comprising:
an uncompressed memory;
a compressed memory;
a processor communicatively coupled to the uncompressed memory and the compressed memory; and
a compression manager communicatively coupled to the processor, wherein the compression manager is configured to perform a method comprising:
analyzing a dataset stored in a memory page of the uncompressed memory;
identifying a data type associated with the dataset;
identifying, based on the analyzing, a population count associated with the dataset;
comparing the data type and the population count to a plurality of compressibility information sets, wherein each of the plurality of compressibility sets comprises historical data identifying a compressibility rate achieved for a dataset of a given data type and a given population count;
identifying, based on the comparing, a compressibility information set matching the data type and the population count associated with the memory page storing the dataset;
comparing the compressibility rate associated with the identified compressibility information to at least one threshold; and
based on the comparing, one of selecting and rejecting the memory page storing the dataset for compression.

11. The information processing system of claim 10, wherein identifying the population count comprises:
analyzing a binary representation of the dataset; and
counting a total number of 1s in the binary representation of the dataset, wherein the total number of 1s is the population count.

12. The information processing system of claim 10, wherein the one of selecting and rejecting is based on the memory page storing the dataset being selected to be moved from the uncompressed memory to the compressed memory.

13. The information processing system of claim 10, wherein the one of selecting and rejecting is further based on the memory page storing the dataset being stored in the uncompressed memory.

14. The information processing system of claim 10, wherein the one of selecting and rejecting is further based on the memory page storing the dataset currently having a compression operation being performed therein.

15. A computer program product for selecting memory pages for compression, the computer program product comprising:
a non-transitory storage medium readable by a processing circuit and storing instructions for execution by the processing circuit for performing a method comprising:
analyzing a dataset stored in a memory page of an uncompressed memory;
identifying, based on the analyzing, a population count associated with the dataset;
determining at least one of a data type associated with the dataset and a page size associated with the memory page storing the dataset;
identifying, from a plurality of compressibility information sets, a compressibility information set matching the data type and the population count associated with the memory page storing the dataset;
comparing the compressibility rate associated with the identified compressibility information to at least one threshold, each compressibility information set comprising historical data identifying a compressibility rate achieved for a dataset of a given data type and a given population count;
based on the comparing, one of selecting and rejecting the memory page storing the dataset for compression.

16. The computer program product of claim 15, wherein identifying the population count comprises:
analyzing a binary representation of the dataset; and
counting a total number of 1s in the binary representation of the dataset, wherein the total number of 1s is the population count.

17. The computer program product of claim 15, wherein the one of selecting and rejecting is further based on the memory page storing the dataset being selected to be moved from the uncompressed memory to a compressed memory.

18. The computer program product of claim 15, wherein the one of selecting and rejecting is further based on the memory page storing the dataset being stored in the uncompressed memory.

19. The computer program product of claim 15, wherein the one of selecting and rejecting is further based on the memory page storing the dataset currently having a compression operation being performed therein.

20. The computer program product of claim 15, wherein the at least one threshold is based on previously calculated population counts for data stored in memory pages in the uncompressed memory, and an amount of compression achieved for the memory page storing the dataset after a compression operation was performed thereon.

* * * * *